(12) United States Patent
Yeh

(10) Patent No.: US 11,880,534 B2
(45) Date of Patent: Jan. 23, 2024

(54) TOUCH SENSITIVE PROCESSING METHOD, APPARATUS AND TOUCH SYSTEM

(71) Applicant: EGALAX_EMPIA TECHNOLOGY INC., Taipei (TW)

(72) Inventor: Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/138,982

(22) Filed: Apr. 25, 2023

(65) Prior Publication Data

US 2023/0266847 A1    Aug. 24, 2023

Related U.S. Application Data

(63) Continuation of application No. 17/318,138, filed on May 12, 2021, now Pat. No. 11,669,209.

(30) Foreign Application Priority Data

May 27, 2020    (TW) .................................. 109117810

(51) Int. Cl.
*G06F 3/041*    (2006.01)
*G06F 3/044*    (2006.01)

(52) U.S. Cl.
CPC ........ *G06F 3/04186* (2019.05); *G06F 3/0446* (2019.05); *G06F 3/04166* (2019.05)

(58) Field of Classification Search
CPC . G06F 3/04186; G06F 3/04166; G06F 3/0446
See application file for complete search history.

(56) References Cited

U.S. PATENT DOCUMENTS

| | | | |
|---|---|---|---|
| 10,656,762 | B2 | 5/2020 | Yeh |
| 11,320,927 | B2 | 5/2022 | Yang |
| 2019/0155451 | A1 | 5/2019 | Yeh |
| 2020/0356209 | A1 | 11/2020 | Yang |

*Primary Examiner* — Michael Pervan
(74) *Attorney, Agent, or Firm* — WPAT, P.C.

(57) ABSTRACT

A touch sensitive processing method, comprising: performing mutual capacitance detection via a touch panel to retrieve an image which including two-dimension sensing information; calculating one or more touching or approximating event corresponding to externally conductive object according to the image; determining whether an area surrounding a position corresponding to the touching or approximating event is normal; and reporting the touching or approximating event in response to the area is determined normal.

15 Claims, 8 Drawing Sheets

800

810
calculating a predicted position according to a trajectory corresponding to a touching or approximating position 820
calculating an adjusted position according to the predicted position and the touching or approximating position 720
reporting the adjusted position to the host

TOUCH SENSITIVE PROCESSING METHOD, APPARATUS AND TOUCH SYSTEM

CROSS REFERENCE TO RELATED PATENT APPLICATION

This patent application is a continuation application of a patent application, No. 17,318,138 filed on May 12, 2021, based on a Taiwan, R.O.C. patent application No. 109117810 filed on May 27, 2020.

FIELD OF THE INVENTION

The present invention relates to touch sensitive detection, and more particularly, to touch sensitive processing method utilizing mutual-capacitance principle.

BACKGROUND OF THE INVENTION

Touch screen or touch panel is one of common input/output interfaces of modern electronic system. Especially a touch sensitive system utilizing mutual-capacitance principle may receive multiple inputs from fingers concurrently. When sizes of touch screens grow gradually, number of touch electrodes on the touch screen increase subsequently. Speed of scanning whether external conductive object on the touch screen is getting slow accordingly. Besides, when sizes of touch screens are getting bigger and bigger, chances for foreign objects placed on touch screens are also getting higher and higher. For examples, water drops may be stayed on small portions of touch screens, and metal objects such as paper clips may be placed on top of touch screens. It is possible that non-conductors pressed on touch screens so as parts of touch screen are distorted or deformed.

When traditional touch sensitive processing apparatus scans and finds that part of the scanned image is abnormal, it gives up following mutual-capacitance detections. Under this circumstance, touch sensitive function is totally failed. Another solution to deal with this problem is to skip examination of the scanned image. However, it may cause position shifting of touching or approximating event detected by mutual-capacitance scan such as host of the touch screen or touch panel receives error command.

In both of the abovementioned situations, user cannot input any meaningful touch command. Hence, it is desired to have a touch sensitive system, adapting to larger touch screen or touch panel, which is capable of reserving normal touch sensitive function in other area when part of the touch screen or touch panel is abnormal.

SUMMARY OF THE INVENTION

According to an embodiment, a provided touch sensitive processing method, comprising: performing mutual-capacitance detection using a touch panel to retrieve an image which comprises two dimensional sensing information; calculating at least one touching or approximating event corresponding to at least one external conductive object according to the image; determining whether a surrounding area corresponding to a touching or approximating position of the touching or approximating event is normal; and reporting the touching or approximating event to a host when the surrounding area is determined normal.

According to an embodiment of the present application, a provided touch sensitive processing apparatus, coupled to a touch panel including parallel first electrodes and parallel second electrodes, each of the first electrodes intersects with the second electrodes, the touch sensitive apparatus comprising: a driving circuit module, configured to transmit a driving signal to one of the first electrodes in a time-sharing manner; a sensing circuit module, configured to sense the driving signal via the second electrodes of the touch panel in the time-sharing manner; and a processor module, coupled to the driving circuit module and the sensing circuit module, configured to execute instructions stored in non-volatile memory to realize the following steps: having the driving circuit module and the sensing circuit module perform mutual-capacitance detection to retrieve an image which comprises two dimensional sensing information; calculating at least one touching or approximating event corresponding to at least one external conductive object according to the image; determining whether a surrounding area corresponding to a touching or approximating position of the touching or approximating event is normal; and reporting the touching or approximating event to a host when the surrounding area is determined normal.

According to one embodiment of the present application, a provided touch sensitive system, comprising the abovementioned touch sensitive processing apparatus, the touch panel and the host.

In summarized, the touch sensitive processing method, apparatus and touch sensitive system provided by the present application is able to reserve normal touch sensitive function in other area when part of the touch screen or touch panel is abnormal. Near the abnormal area, adjustment methods are provided in order to provide a smooth trajectory to fit user's experience. Hence, user can input in the abnormal area and get anticipated input effect.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
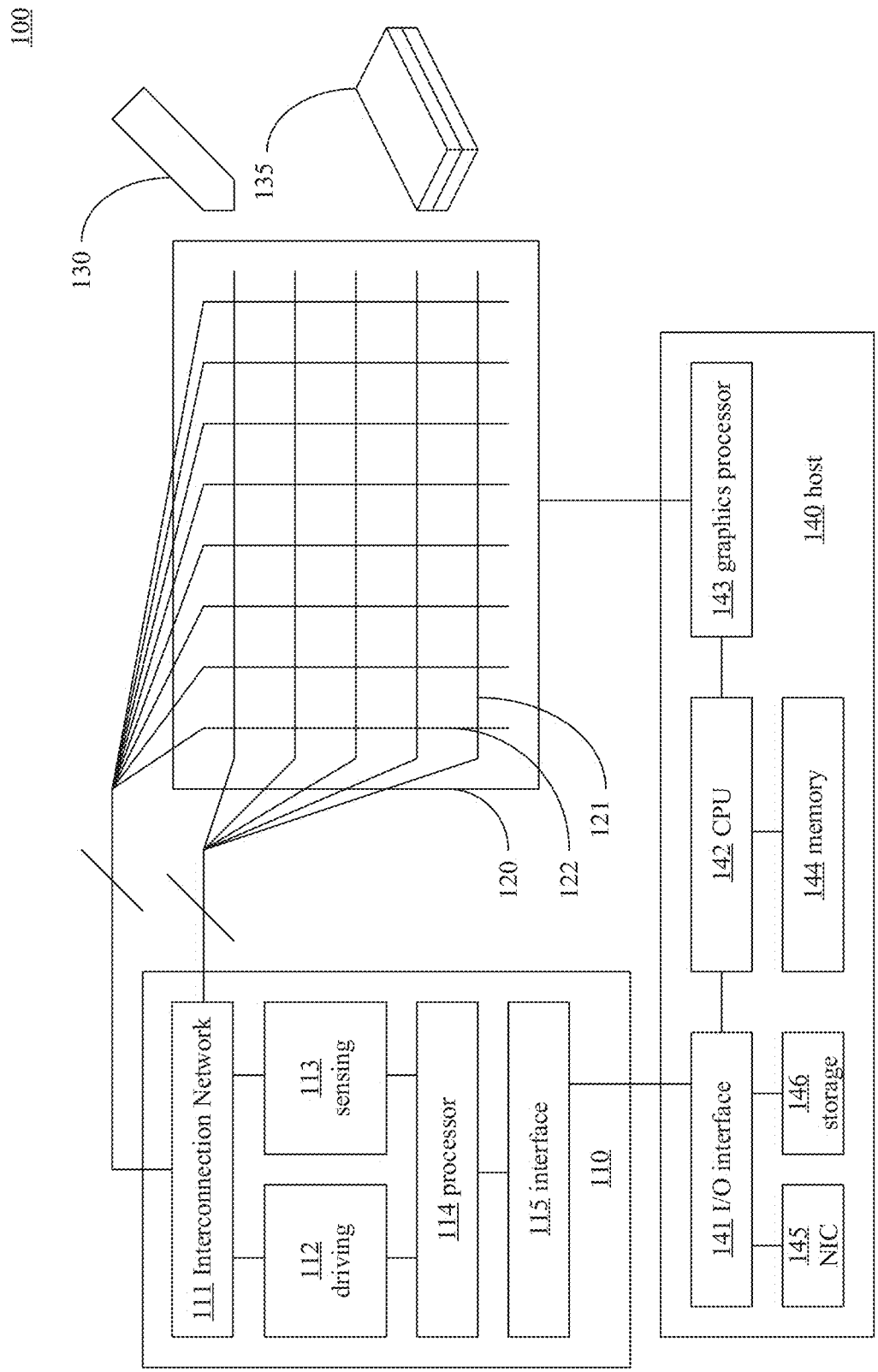
FIG. 1 shows a block diagram of a touch sensitive system in accordance with an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a block diagram of a touch sensitive system 100 in accordance with an embodiment of the present invention. The touch sensitive system 100 may be normal desktop, laptop, tablet personal computer, industrial control computer, smart phone or any other computer system with touch sensitive function.

The touch sensitive system 100 may comprise a touch sensitive processing apparatus 110, a touch panel or touch screen 120 coupled to the touch sensitive processing apparatus 110 and a host 140 coupled to the touch sensitive processing apparatus 110. The touch sensitive system 100 may further comprises one or more styli 130 and/or touch board erasers 135. Hereinafter, the touch panel or screen 120 may be collectively referred as touch screen 120. However, in embodiments which are lack of display function, person has ordinary skill in the art can understand that the touch screen denoted in the present application is actually a touch panel.

The touch screen 120 comprises first electrodes 121 in parallel to a first axis and second electrodes 122 in parallel to a second axis. The first electrode 121 intersects with multiple of the second electrodes 122 in order to form multiple sensing points or areas. Similarly, the second electrode 122 intersects with multiple of the first electrodes 121 in order to form multiple sensing points or areas. In some embodiment, the present application uses first touch electrodes 121 to refer to the first electrodes 121 and uses second touch electrodes to refer to the second electrodes 122. The present application also calls touch electrodes to refer to the first electrodes 121 and the second electrodes 122 collectively. In some embodiments, the first electrodes 121 and the second electrodes 122 may be made by transparent materials. The first electrodes 121 and the second electrodes 122 may be placed in one electrode layer. Multiple conductive plates of each of the first electrodes 121 or the second electrodes 122 may be connected by bridging. Alternatively, the first electrodes 121 and the second electrodes 122 may be placed in two overlaid electrode layers. Unless specified particularly, the present application usually is applicable to single-layer or multiple-layer embodiments. The first axis is usually perpendicular to the second axis. However, the present application does not limit that the first axis has to be perpendicular to the second axis. In one embodiment, the first axis may be the horizontal axis or a refresh axis of the touch screen 120.

The touch sensitive processing apparatus 110 may comprise following hardware circuit modules: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 and the host 140 may be implemented in the same integrated circuits, or in the same chip. In other words, the present application does not limit how to implement the touch sensitive processing apparatus 110.

The interconnection network module 111 is configured to connect each of the multiple first electrodes and/or the multiple second electrodes of the touch screen 120. The interconnection network module 111 may accept control command of the processor module 114 for connecting the driving circuit module 112 and any one or more touch electrodes and for connecting the sensing circuit 112 and any one or more touch electrodes. The interconnection network module 111 may include a combination of one or more MUX to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), I2C, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch erasers 135. The stylus 130 and touch eraser 136 may be transmitters which emit electrical signals. The transmitters may include active transmitter which actively emits electrical signals or passive transmitter which emits electrical signals in response to outside electrical signals. The stylus 130 and touch eraser 136 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 130 or touch erasers 135 and touch sensitive processing apparatus 110 may use the aforementioned modulation and demodulation methods to transmit message via the electrical signals.

The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
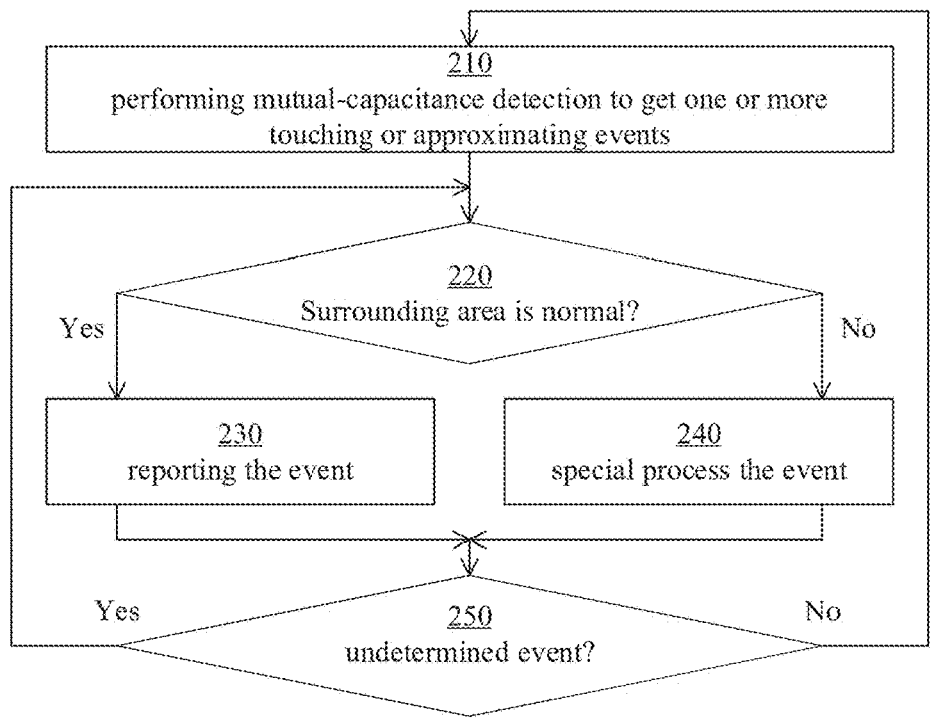
FIG. 2 depicts a flowchart diagram of a mutual-capacitance sensing method in accordance with an embodiment of the present invention.

Please refer to FIG. 2, which depicts a flowchart diagram of a mutual-capacitance sensing method 200 in accordance with an embodiment of the present invention. The mutual-capacitance sensing method 200 may applicable to the touch sensitive processing apparatus 110 as shown in FIG. 1. Especially the processor module 114 may execute instructions arranged according to the method in order to realize the mutual-capacitance sensing method 200.

Step 210: performing mutual-capacitance sensing for detecting one or more touching or approximating events. In one embodiment, the processor module 114 of the touch sensitive processing apparatus 110 may has the driving circuit 112 sequentially transmits driving signals to one of the first electrodes 121 via the interconnection network 111 and has the sensing circuit 113 sensing the driving signals induced by each of the second electrodes 122 via the interconnection network 111 in each time. The result of each time is one-dimensional sensing information which may include sensing signals of each one of the second electrodes 122, differences between sensing signals of two adjacent second electrodes 122 or differences between the differences between sensing signals of two adjacent second electrodes 122. Multiple of the one-dimensional sensing information form two-dimensional sensing information or an image according to the positions of the driven first electrodes 121. According to the image, one or more touching or approximating events corresponding to one or more external conductive objects with respect to the touch screen 120 may be calculated. Person has ordinary skill in the art can understand that there are multiple embodiments of step 210. Embodiments as shown in previous patent publications provided by the Applicant may be used as references here.

Figure 3:
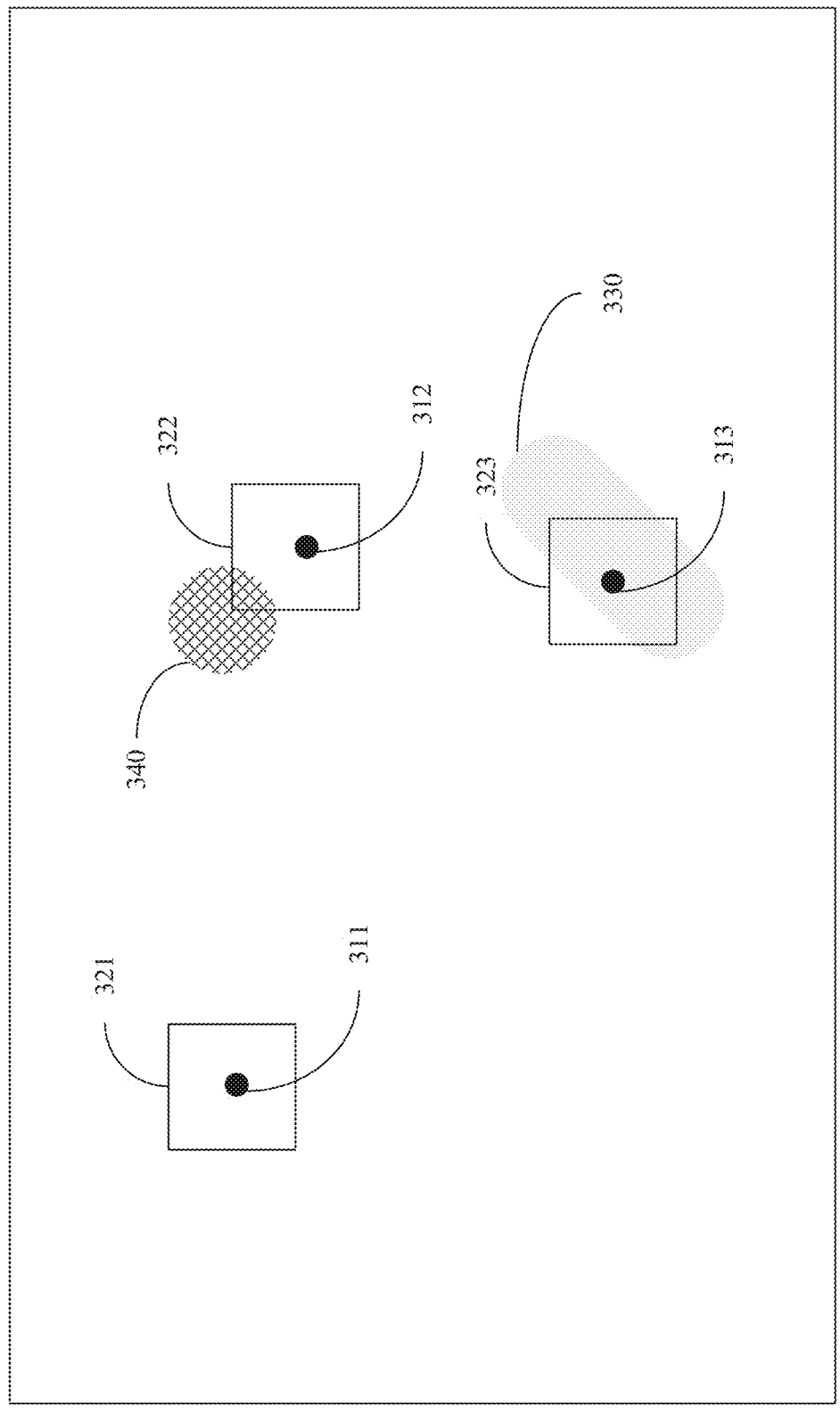
FIG. 3 illustrates a diagram of multiple touches on touch screen 120 according to an embodiment of the present invention.

Please refer to FIG. 3, which illustrates a diagram of multiple touches on touch screen 120 according to an embodiment of the present invention. After the step 210 is performed, three touching or approximating events are calculated at a first position 311, a second position 312 and a third position 313 on the touch screen 120.

Step 220: determining whether a surrounding area corresponding to a position of a touching or approximating event is normal. In the embodiment as shown in FIG. 3, three surrounding areas 321, 322 and 323 corresponding to the three positions are set up by the touch sensitive processing apparatus 130, respectively. When the step 220 is performed in first time, the surrounding area 321 of the first position 311 of the first touching and approximating event is determined normal or abnormal. When the step 220 is performed in second time, the surrounding area 322 of the second position 311 of the second touching and approximating event is determined normal or abnormal. And so on.

The present application does not limit the size and the shape of the surrounding area. In a preferred embodiment, the shape of the surrounding area is axis-symmetric, such as a rectangle or a circle. In a preferred embodiment, the surrounding area includes the position. In a preferred embodiment, the position is at the center of the surrounding area or in a range from the center of the surrounding area.

On the touch screen 120 as shown in FIG. 3, water is stayed in a water area 330. Besides, a cup is put on top of the touch screen 120 such that a structural deformation is happened in an area 340. Before executing the touch sensitive processing method 200 as shown in FIG. 2, the touch sensitive processing apparatus 110 may perform a scan of stray values to get a baseline image. When the baseline image is retrieved, the water area 330 and the area 340 are not appeared on the touch screen 120.

When the step 220 is performed the first time, the touch sensitive processing apparatus 110 may compare the image with the baseline image and determine that the surrounding area 321 is normal if the values of the surrounding area 321 in these two images are not too different. The flow proceeds to step 230.

When the step 220 is performed the second time, the touch sensitive processing apparatus 110 may compare the image with the baseline image and find out it is unusual, i.e., the area 340 is deformed by external non-conductive object's pressure. The touch sensitive processing apparatus 110 determines that the surrounding area 322 is abnormal, and the flow proceeds to step 240.

When the step 220 is performed the third time, the touch sensitive processing apparatus 110 may compare the image with the baseline image and find out it is unusual, i.e., water (area 330) stays around inside the surrounding area 323. The touch sensitive processing apparatus 110 determines that the surrounding area 322 is abnormal, and the flow proceeds to step 240.

In a preferred embodiment, a first value may be calculated by adding boundary sensing information of the image together corresponding to the surrounding area. Then a second value may be calculated by adding boundary sensing information of the baseline image together corresponding to the surrounding area. If an absolute value of a difference between the first value and the second value is in a certain range, it is determined that the surrounding area is normal. In this embodiment, the boundary sensing information may comprise sensing information of corners of the surrounding area, sensing information of edges of the surrounding area or both.

Take an example, if the surrounding area is a rectangle, the first value may be a sum of four corner sensing information of the image corresponding to the surrounding area. The second value may be a sum of four corner sensing information of the baseline image corresponding to the surrounding area. If an absolute value of a difference between the first value and the second value is in a certain range, it is determined that the surrounding area is normal.

In a preferred embodiment, it may calculate differences between the boundary sensing information of the image and the baseline image corresponding to the surrounding area. Then a sum of these differences is added. If the sum is in a range, it is determined that the surrounding area is normal.

In other words, the abovementioned methods examine that whether values of the sensing information of the image near the position are closed to the corresponding sensing information of the baseline image. If they are closed, it is determined that the surrounding area is normal.

Figure 4:
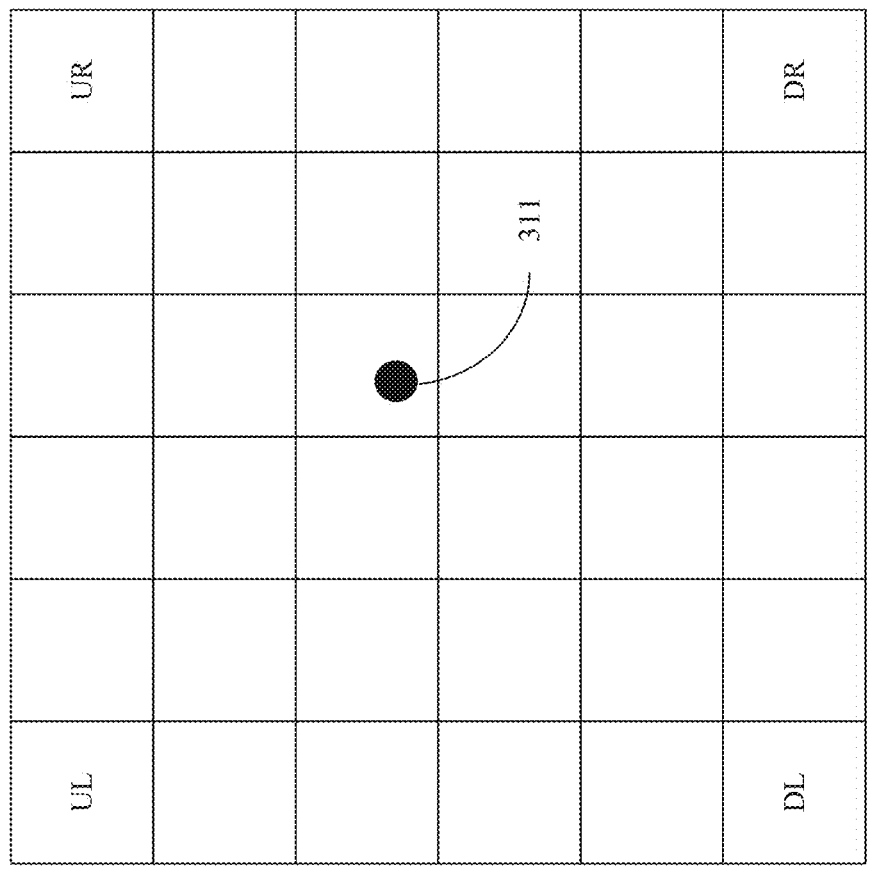
FIG. 4 depicts a diagram of two dimensional sensing information of a surrounding area in accordance with an embodiment of the present invention.

In addition to compare with sensing information of the baseline image, the sensing information of the image can be used in comparisons alone. Please refer to FIG. 4, which depicts a diagram of two dimensional sensing information of a surrounding area 321 in accordance with an embodiment of the present invention. As shown in FIG. 4, because the position 311 is calculated according to values of sensing information and positions of electrodes, the position 311 may not be at one of the first electrodes 121 or the second electrodes 122.

The surrounding area 321 comprises 6×6 sensing information. At step 220, there are several methods to determine whether the surrounding area 321 of the image is normal. In a preferred embodiment, if an absolute value of differences between the upper left corner UL and the lower right corner DR is in a range, it is determined that the surrounding area is normal. In a preferred embodiment, if an absolute value of differences between the upper right corner UR and the lower left corner DL is in a range, it is determined that the surrounding area is normal.

In a preferred embodiment, a first difference between the upper left corner UL and the upper right corner UR is calculated. Then a second difference between the lower left corner DL and the lower right corner DR is calculated. If an absolute value of a difference between the first difference and the second difference is in a range, it is determined that the surrounding area is normal.

In a preferred embodiment, a first difference between the upper left corner UL and the lower left corner DL is calculated. Then a second difference between the upper right corner UR and the lower right corner DR is calculated. If an absolute value of a difference between the first difference and the second difference is in a range, it is determined that the surrounding area is normal.

Person has ordinary skill in the art can understand that one or more abovementioned methods may be used to determine the surrounding area is normal or not. If any one of the methods shows abnormal, it may be determined that the surrounding area is abnormal.

Step 230: reporting the touching or approximating event. Since the surrounding area corresponding to the touching or approximating event is normal, the information related to the touching or approximating event is reported to the host 140.

Step 240: special processing the touching or approximating event. In this application, there may be several kinds of special processing. The first kind of special processing is to remove the touching or approximating event. At step 260, the touching or approximating event would not be reported to the host 140. If the touch sensitive processing apparatus 110 does not process the touching or approximating event in other ways, it would be discarded and would not be reported to the host 140.

The second kind of special processing is to adjust the position of the touching or approximating event according to a trajectory. For example, when the position 313 is within in the water area 330, the position 313 is not at the position of a finger because it is interfered by the water. However, the touch sensitive processing apparatus 130 may calculate an adjusted position according to a trajectory (one or more previous touching or approximating positions) and the position 313. And the adjusted position would be reported to the host 140.

Figure 5:
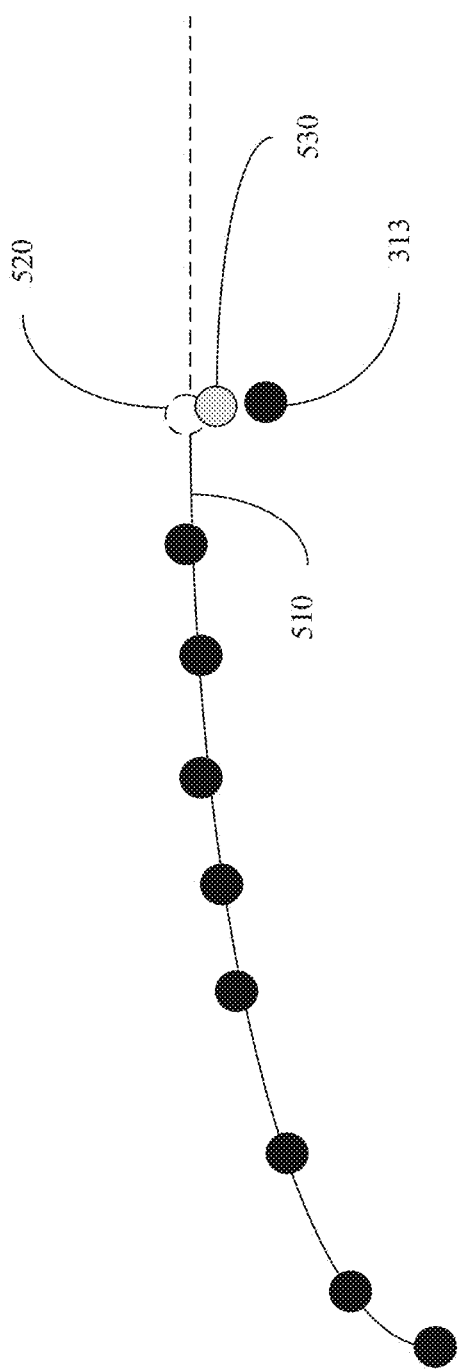
FIG. 5 illustrates a diagram of adjusting a position by a trajectory in accordance with an embodiment of the present invention.

Please refer to FIG. 5, which illustrates a diagram of adjusting a position by a trajectory in accordance with an embodiment of the present invention. As shown in FIG. 5, the touch sensitive processing apparatus already determine a trajectory 510 according to previous touching or approximating positions, i.e., black dots without numerals as shown. A predicted position 520 should be a place where the next touching or approximating event locates according to the trajectory 510. However, affected by water or any other interference, the position 313 is calculated by the touch sensitive processing apparatus 110. In a preferred embodiment, an adjusted position 530 may be calculated according to the predicted position 520 and the calculated position 313 such that a shift between the adjusted position 530 and the trajectory 510 is in an acceptable range. In this embodiment, the adjusted position 530 would be reported to the host 140.

In an alternative embodiment, it is not required to report the adjusted position 530 immediately to the host 140. Since the finger covers an area, in case a distance between two touching or approximating position is not larger than a whole or a part of width of the finger, the touch sensitive processing apparatus 110 may postpone the report of the adjusted position 530. It is the third special processing.

Figure 6:
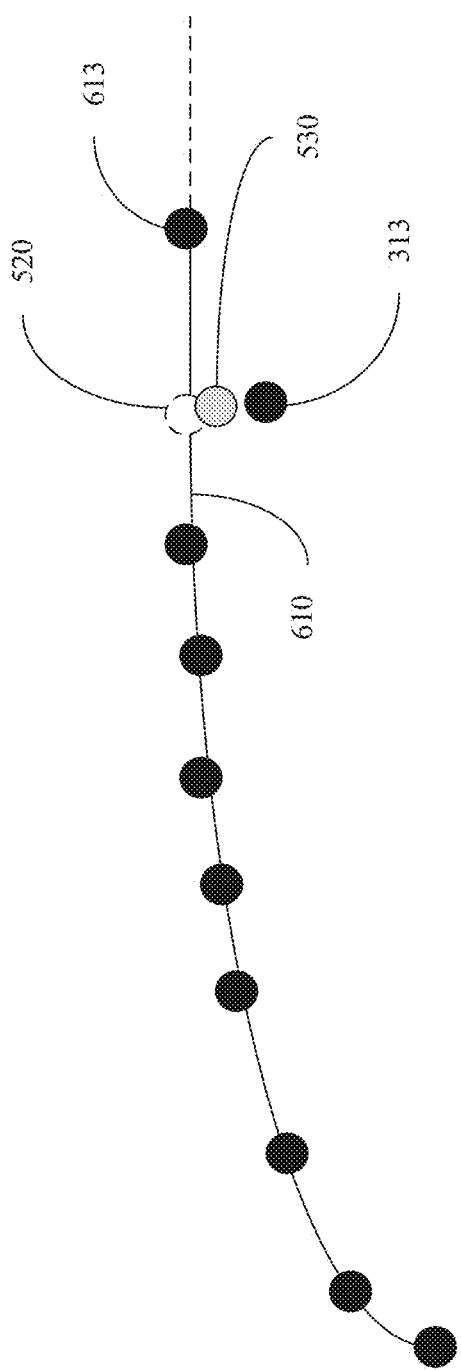
FIG. 6 illustrates a diagram of adjusting a position by a trajectory in accordance with an embodiment of the present invention.

Please refer to FIG. 6, which illustrates a diagram of adjusting a position by a trajectory in accordance with an embodiment of the present invention. Embodiment as shown in FIG. 6 happens after the embodiment as shown in FIG. 5.

After a new round of touch sensitive processing method 200 is executed, the touch sensitive processing apparatus 130 calculates a new position 613 and determines that the surrounding area corresponding to the new position 613 is normal. Based on the existing trajectory 510 and the position 613, a new trajectory 610 is generated. In this moment, the touch sensitive processing apparatus 110 can determine that the predicted position 520 is correct. The position 313 is off the trajectory 610 because of interferences. Hence, the touch sensitive processing apparatus 110 may sequentially report the predicted position 520 and the new position 613 to the host 140 and discarding the previous position 313 and the adjusted position 530.

Please return to FIG. 2, at step 250: determining whether there is unprocessed touching or approximating event. If there is one touching or approximating event which is not determined at step 220, the flow returns to step 220. Otherwise, the flow returns to step 210 for a next round of detection.

The fourth kind of special process is to adjust the touching or approximating position according to a special adjustment rule. Because the size of the touch screen 120 is large, the first electrodes 121 and the second electrodes 122 may not be manufactured perfectly but just in acceptable conditions. When the width of an electrode is smaller, the magnitude and phase of the induced driving signal is varied according to resistor-capacitor effect. Or affected by external force, distances between the first electrodes 121 and the second electrodes changed a little bit, e.g., a structural deformation caused by weight of the cup as shown in FIG. 3. Hence, when the touch screen 120 is manufactured or measured periodically, areas need to be corrected may be marked according to the baseline images. And the variations found in the baseline image may be used to determine the adjustment rules.

In other words, in one embodiment, step 220 as shown in FIG. 2 may further comprises determining the position is inside an area of positional adjustment. If the position is inside an area of positional adjustment, the flow proceeds to the step 240 for special processing. And the fourth kind of special processing is to adjust the position according to the adjustment rules and to report the adjusted position to the host 140.

Figure 7:
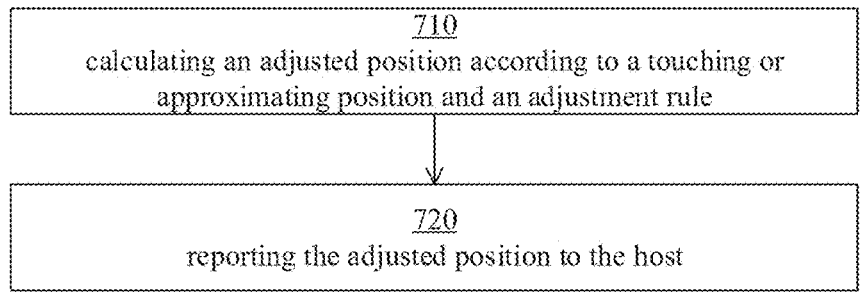
FIG. 7 shows a flowchart diagram of a special process method of the position in accordance with an embodiment of the application.

Please refer to FIG. 7, which shows a flowchart diagram of a special process method of the position in accordance with an embodiment of the application. The process method 700 may be an embodiment of step 240 as shown in FIG. 2. The process method 700 is applicable to the touch sensitive processing apparatus 110 as shown in FIG. 1. Especially the processor module 114 may execute instructions arranged according to the method in order to realize the mutual-capacitance sensing method.

Step 710: calculating an adjusted position according to a touching or approximating position and an adjustment rule. In case there is manufacture error or structural deformation of the touch screen 120, the touching or approximating position may be adjusted according to the adjustment rule.

Step 720: reporting the adjusted position to the host.

Figure 8:
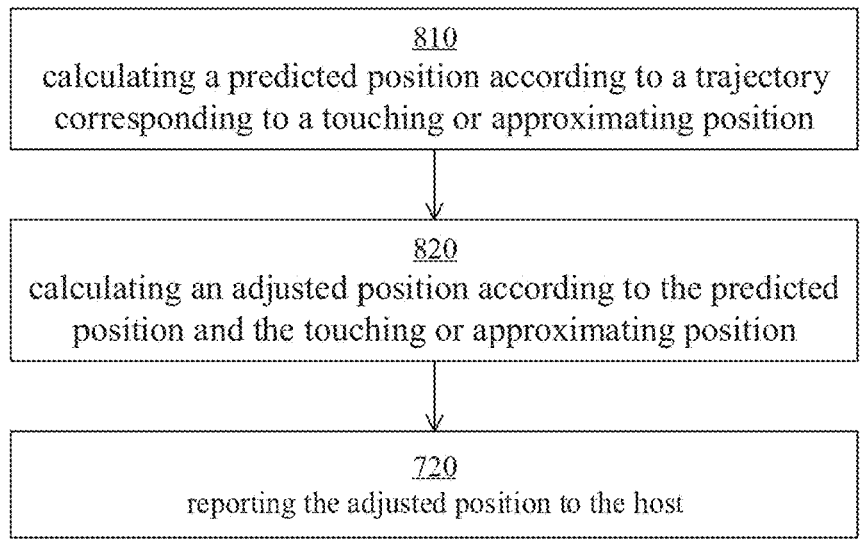
FIG. 8 shows a flowchart diagram of a special process method of the position in accordance with an embodiment of the application.

Please refer to FIG. 8, which shows a flowchart diagram of a special process method of the position in accordance with an embodiment of the application. The process method 800 may be an embodiment of step 240 as shown in FIG. 2. Embodiment as shown in FIG. 5 may be referenced here. The process method 800 is applicable to the touch sensitive processing apparatus 110 as shown in FIG. 1. Especially the processor module 114 may execute instructions arranged according to the method in order to realize the mutual-capacitance sensing method.

Step 810: calculating a predicted position according to a trajectory corresponding to a touching or approximating position. The predicted position may be generated by linear or quadratic extrapolation of multiple historical positions of the trajectory.

Step 820: calculating an adjusted position according to the predicted position and the touching or approximating position. In embodiment, the adjusted position may be in a point at a line between the adjusted position and the touching or approximating position.

Figure 9:
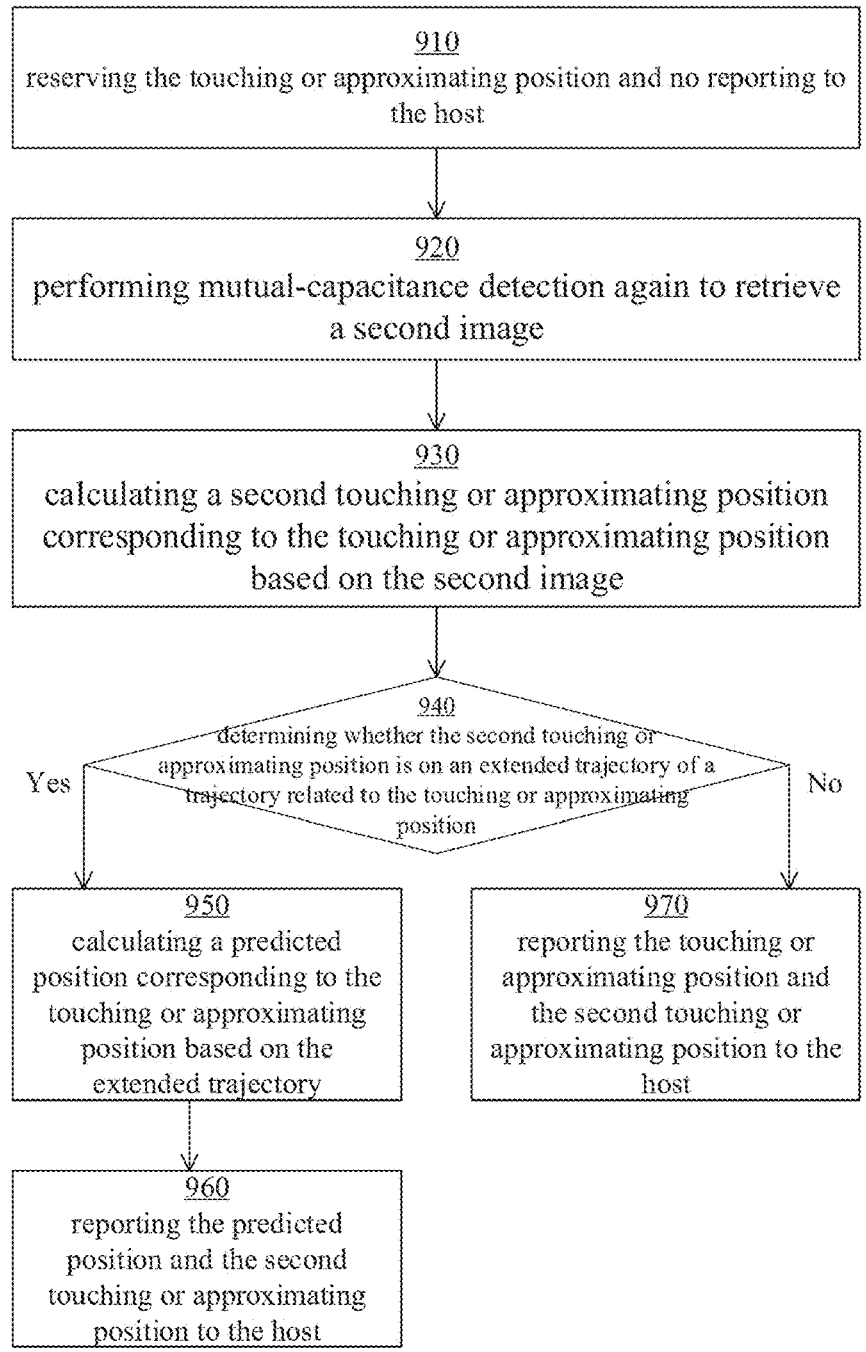
FIG. 9 illustrates a flowchart diagram of a special process method of a touching or approximating event in accordance with an embodiment of the present application.

Please refer to FIG. 9, which illustrates a flowchart diagram of a special process method of a touching or approximating event in accordance with an embodiment of the present application. The process method 900 may be an embodiment of step 240 as shown in FIG. 2. Embodiment as shown in FIG. 6 may be referenced here. The process method 900 is applicable to the touch sensitive processing apparatus 110 as shown in FIG. 1. Especially the processor module 114 may execute instructions arranged according to the method in order to realize the mutual-capacitance sensing method.

Step 910: reserving the touching or approximating position and no reporting to the host.

Step 920: performing mutual-capacitance detection again to retrieve a second image.

Step 930: calculating a second touching or approximating position corresponding to the touching or approximating position based on the second image. In one embodiment, when a distance between the touching or approximating position and the second touching or approximating position is within a range, it is determined these two positions are corresponding.

Step 940: determining whether the second touching or approximating position is on an extended trajectory of a trajectory related to the touching or approximating position. In one embodiment, if a minimum distance between the second touching or approximating position and the second trajectory is within a range, it is determined that the second touching or approximating position is on the extended trajectory. If the determination result is true, the flow proceeds to step 950; otherwise, the flow proceeds to step 970.

Step 950: calculating a predicted position corresponding to the touching or approximating position based on the extended trajectory. At step 810, the predicted position is calculated by extrapolation. In one embodiment of this step, method provided by step 810 may be used to calculate the predicted position. In an embodiment of this step, since there is the second touching or approximating position, the predicted position may be calculated by interpolation according to the extended trajectory.

Step 960: reporting the predicted position and the second touching or approximating position to the host.

Step 970: reporting the touching or approximating position and the second touching or approximating position to the host.

In the embodiment as shown in FIG. 9, the touch sensitive processing apparatus postpones the report of the touching or approximating position. It relies on a later position to decide a previous position. This makes the trajectory becomes more smooth. It is more fitted to user experience. The trajectory would not contain accidental positional drift caused by the finger moves across water or other interferences.

According to an embodiment, a provided touch sensitive processing method, comprising: performing mutual-capacitance detection using a touch panel to retrieve an image which comprises two dimensional sensing information; calculating at least one touching or approximating event corresponding to at least one external conductive object according to the image; determining whether a surrounding area corresponding to a touching or approximating position of the touching or approximating event is normal; and reporting the touching or approximating event to a host when the surrounding area is determined normal.

In one embodiment, in order to determine whether the surrounding area is normal according to a flatness of the image near the touching or approximating position, the determining further comprises: calculating an absolute value of a difference between two or more sensing information of the surrounding area in the image; and determining the surrounding area is normal when the absolute value is smaller than a threshold. In one embodiment, in order to provide convenient calculation, the surrounding area is a rectangle, the two sensing information are selected from sensing information of four corners of the rectangle.

In one embodiment, in order to determine whether the surrounding area is normal according to differences between the image and the baseline image near the touching or approximating position, the determining further comprises: calculating multiple absolute values of differences of values of multiple sensing information between the image and a baseline image corresponding to the surrounding area; and determining the surround area is normal when a sum of the absolute values is smaller than a threshold. In one embodiment, in order to provide convenient calculation, the surrounding area is a rectangle, the multiple sensing information are selected from one or any combination of following: sensing information of a corner of the rectangle; and sensing information of an edge of the rectangle.

In one embodiment, in order to adapt to defects of the touch panel manufactured or structural distortion, the touch sensitive processing method further comprises: calculating an adjusted position according to the touching or approximating event and an adjustment rule when the surrounding area is determined abnormal; and reporting the adjustment position to the host.

In one embodiment, in order to adjust the touching or approximating position according to a trajectory so as the touch command is more fit to user's experience, the touch processing method further comprises: calculating a predicted position according to a trajectory corresponding to the touching or approximating position when the surrounding area is determined abnormal; calculating an adjusted position according to the predicted position and the touching or approximating position; and reporting the adjustment position to the host.

In one embodiment, in order to adjust the touching or approximating position according to a trajectory so as the touch command is more fit to user's experience, the touch processing method further comprises: reserving the touching or approximating position and not reporting the touching or approximating position to the host; performing mutual-capacitance detection using the touch panel again to retrieve a second image; calculating a second touching or approximating position corresponding to the touching or approximating position according to the second image; determining whether the second touching or approximating position is on an extended trajectory related to a trajectory corresponding to the touching or approximating position; calculating a predicted position corresponding to the touching or approximating position according to the extended trajectory, where the predicted position is on the extended trajectory, when the second touching or approximating position is determined on the extended trajectory; and reporting the predicted position and the second touching or approximating position. In one embodiment, in order to reflect a sudden turn of the trajectory, the touch sensitive processing method further comprises reporting the touching or approximating position and the second touching or approximating position when the second touching or approximating position is not determined on the extended trajectory.

According to an embodiment of the present application, a provided touch sensitive processing apparatus, coupled to a touch panel including parallel first electrodes and parallel second electrodes, each of the first electrodes intersects with the second electrodes, the touch sensitive apparatus comprising: a driving circuit module, configured to transmit a driving signal to one of the first electrodes in a time-sharing manner; a sensing circuit module, configured to sense the driving signal via the second electrodes of the touch panel in the time-sharing manner; and a processor module, coupled to the driving circuit module and the sensing circuit module, configured to execute instructions stored in non-volatile memory to realize the following steps: having the driving circuit module and the sensing circuit module perform mutual-capacitance detection to retrieve an image which comprises two dimensional sensing information; calculating at least one touching or approximating event corresponding to at least one external conductive object according to the image; determining whether a surrounding area corresponding to a touching or approximating position of the touching or approximating event is normal; and reporting the touching or approximating event to a host when the surrounding area is determined normal.

In one embodiment, in order to determine whether the surrounding area is normal according to a flatness of the image near the touching or approximating position, the determining further comprises: calculating an absolute value of a difference between two or more sensing information of the surrounding area in the image; and determining the surrounding area is normal when the absolute value is smaller than a threshold. In one embodiment, in order to provide convenient calculation, the surrounding area is a rectangle, the two sensing information are selected from sensing information of four corners of the rectangle.

In one embodiment, in order to determine whether the surrounding area is normal according to differences between the image and the baseline image near the touching or approximating position, the determining further comprises: calculating multiple absolute values of differences of values of multiple sensing information between the image and a baseline image corresponding to the surrounding area; and determining the surround area is normal when a sum of the absolute values is smaller than a threshold. In one embodiment, in order to provide convenient calculation, the surrounding area is a rectangle, the multiple sensing information are selected from one or any combination of following: sensing information of a corner of the rectangle; and sensing information of an edge of the rectangle.

In one embodiment, in order to adapt to defects of the touch panel manufactured or structural distortion, the processor module is further configured for: calculating an adjusted position according to the touching or approximating event and an adjustment rule when the surrounding area is determined abnormal; and reporting the adjustment position to the host.

In one embodiment, in order to adjust the touching or approximating position according to a trajectory so as the touch command is more fit to user's experience, the processor module is further configured for: calculating a predicted position according to a trajectory corresponding to the touching or approximating position when the surrounding area is determined abnormal; calculating an adjusted position according to the predicted position and the touching or approximating position; and reporting the adjustment position to the host.

In one embodiment, in order to adjust the touching or approximating position according to a trajectory so as the touch command is more fit to user's experience, the processor module is further configured for: reserving the touching or approximating position and not reporting the touching or approximating position to the host; performing mutual-capacitance detection using the touch panel again to retrieve a second image; calculating a second touching or approximating position corresponding to the touching or approximating position according to the second image; determining whether the second touching or approximating position is on an extended trajectory related to a trajectory corresponding to the touching or approximating position; calculating a predicted position corresponding to the touching or approximating position according to the extended trajectory, where the predicted position is on the extended trajectory, when the second touching or approximating position is determined on the extended trajectory; and reporting the predicted position and the second touching or approximating position. In one embodiment, in order to reflect a sudden turn of the trajectory, the processor module is further configured for: reporting the touching or approximating position and the second touching or approximating position when the second touching or approximating position is not determined on the extended trajectory.

According to one embodiment of the present application, a provided touch sensitive system, comprising the above-mentioned touch sensitive processing apparatus, the touch panel and the host.

In summarized, the touch sensitive processing method, apparatus and touch sensitive system provided by the present application is able to reserve normal touch sensitive function in other area when part of the touch screen or touch panel is abnormal. Near the abnormal area, adjustment methods are provided in order to provide a smooth trajectory to fit user's experience. Hence, user can input in the abnormal area and get anticipated input effect.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method, comprising:
   performing mutual-capacitance detection using a touch panel to retrieve an image which comprises two dimensional sensing information;
   calculating at least one touching or approximating event corresponding to at least one external conductive object according to the image;
   determining whether a surrounding area corresponding to a touching or approximating position of the touching or approximating event is normal;
   reporting the touching or approximating event to a host when the surrounding area is determined normal;

calculating a predicted position according to a trajectory corresponding to the touching or approximating position when the surrounding area is determined abnormal;

calculating an adjusted position according to the predicted position and the touching or approximating position; and reporting the adjustment position to the host when the surrounding area is determined abnormal.

2. The touch sensitive processing method as claimed in claim 1, wherein the determining further comprises:

calculating an absolute value of a difference between two or more sensing information of the surrounding area in the image; and determining the surrounding area is normal when the absolute value is smaller than a threshold.

3. The touch sensitive processing method as claimed in claim 2, wherein the surrounding area is a rectangle, the two sensing information are selected from sensing information of four corners of the rectangle.

4. The touch sensitive processing method as claimed in claim 1, wherein the determining further comprises:

calculating multiple absolute values of differences of values of multiple sensing information between the image and a baseline image corresponding to the surrounding area; and determining the surround area is normal when a sum of the absolute values is smaller than a threshold.

5. The touch sensitive processing method as claimed in claim 4, wherein the surrounding area is a rectangle, the multiple sensing information are selected from one or any combination of following:

sensing information of a corner of the rectangle; and
sensing information of an edge of the rectangle.

6. The touch sensitive processing method as claimed in claim 1, further comprises:

reserving the touching or approximating position and not reporting the touching or approximating position to the host;

performing mutual-capacitance detection using the touch panel again to retrieve a second image;

calculating a second touching or approximating position corresponding to the touching or approximating position according to the second image;

determining whether the second touching or approximating position is on an extended trajectory related to a trajectory corresponding to the touching or approximating position;

calculating a predicted position corresponding to the touching or approximating position according to the extended trajectory, where the predicted position is on the extended trajectory, when the second touching or approximating position is determined on the extended trajectory; and reporting the predicted position and the second touching or approximating position.

7. The touch sensitive processing method as claimed in claim 6, further comprises:

reporting the touching or approximating position and the second touching or approximating position when the second touching or approximating position is not determined on the extended trajectory.

8. A touch sensitive processing apparatus, coupled to a touch panel including parallel first electrodes and parallel second electrodes, each of the first electrodes intersects with the second electrodes, the touch sensitive apparatus comprising:

a driving circuit module, configured to transmit a driving signal to one of the first electrodes in a time-sharing manner;

a sensing circuit module, configured to sense the driving signal via the second electrodes of the touch panel in the time-sharing manner; and a processor module, coupled to the driving circuit module and the sensing circuit module, configured to execute instructions stored in non-volatile memory to realize the following steps:

having the driving circuit module and the sensing circuit module perform mutual-capacitance detection to retrieve an image which comprises two dimensional sensing information;

calculating at least one touching or approximating event corresponding to at least one external conductive object according to the image;

determining whether a surrounding area corresponding to a touching or approximating position of the touching or approximating event is normal;

reporting the touching or approximating event to a host when the surrounding area is determined normal;

calculating a predicted position according to a trajectory corresponding to the touching or approximating position when the surrounding area is determined abnormal;

calculating an adjusted position according to the predicted position and the touching or approximating position; and reporting the adjustment position to the host when the surrounding area is determined abnormal.

9. The touch sensitive processing apparatus as claimed in claim 8, wherein the determining further comprises:

calculating an absolute value of a difference between two or more sensing information of the surrounding area in the image; and determining the surrounding area is normal when the absolute value is smaller than a threshold.

10. The touch sensitive processing apparatus as claimed in claim 9, wherein the surrounding area is a rectangle, the two sensing information are selected from sensing information of four corners of the rectangle.

11. The touch sensitive processing apparatus as claimed in claim 8, wherein the determining further comprises:

calculating multiple absolute values of differences of values of multiple sensing information between the image and a baseline image corresponding to the surrounding area; and determining the surround area is normal when a sum of the absolute values is smaller than a threshold.

12. The touch sensitive processing apparatus as claimed in claim 11, wherein the surrounding area is a rectangle, the multiple sensing information are selected from one or any combination of following:

sensing information of a corner of the rectangle; and
sensing information of an edge of the rectangle.

13. The touch sensitive processing apparatus as claimed in claim 8, wherein the processor module is further configured for:

reserving the touching or approximating position and not reporting the touching or approximating position to the host;

performing mutual-capacitance detection using the touch panel again to retrieve a second image;

calculating a second touching or approximating position corresponding to the touching or approximating position according to the second image;

determining whether the second touching or approximating position is on an extended trajectory related to a trajectory corresponding to the touching or approximating position;

calculating a predicted position corresponding to the touching or approximating position according to the extended trajectory, where the predicted position is on the extended trajectory, when the second touching or approximating position is determined on the extended trajectory; and reporting the predicted position and the second touching or approximating position.

14. The touch sensitive processing apparatus as claimed in claim 13, wherein the processor module is further configured for:

reporting the touching or approximating position and the second touching or approximating position when the second touching or approximating position is not determined on the extended trajectory.

15. A touch sensitive system, comprising the touch sensitive processing apparatus, the touch panel and the host recited in claim 8.

\* \* \* \* \*